UNITED STATES PATENT OFFICE 2,182,837

METHOD OF PAVING

Raymond F. Bacon, Bronxville, N. Y., and Isaac Bencowitz, Gulf, Tex., assignors to Texas Gulf Sulphur Company, Houston, Tex., a corporation of Texas No Drawing. Application February 25, 1936, Serial No. 65,688

8 Claims. (Cl. 94—23)

This invention relates to plastic compositions and has for an object the production of a novel composition and the provision of a novel method of producing the same. More particularly the invention contemplates the production of a novel plastic composition comprising sulphur and asphalt and the provision of a novel method of producing such a composition. The invention further contemplates the production of improved products and articles through the use of the novel composition of the invention.

The invention is based on our discovery that plastic compositions having desirable properties may be produced by mixing elemental sulphur and asphalt under properly controlled conditions.

It is well known that elemental sulphur will react with asphalt at elevated temperatures, with evolution of hydrogen sulphide, to produce a harder and higher melting point asphalt. The resulting product has some desirable properties, but its properties are such that it is less desirable than unaltered or unmodified asphalt for many of the uses for which asphalt is employed. We have discovered that elemental sulphur may be mixed, without chemical reaction taking place, to produce a plastic composition having the desirable properties of the original asphalt and having, in addition, desirable properties and qualities not possessed by the original asphalt.

According to the method of the invention, elemental sulphur and asphalt are mixed under the influence of heat at a temperature sufficiently high to permit the production of a substantially homogeneous mixture, but not high enough to cause a chemical reaction to take place between the elemental sulphur and the asphalt. The resulting product is a plastic composition comprising elemental sulphur and asphalt. It appears to be a physical combination of sulphur and asphalt of the nature of a solution or, possibly, an emulsion.

In the preferred method of the invention, elemental sulphur is added to hot, molten asphalt with strong stirring, and the mixture is heated while being stirred to a temperature above the melting point of sulphur but not higher than about 160° C. Under these conditions, no hydrogen sulphide is evolved, and we believe that no chemical reaction takes place between the sulphur and the asphalt. Heating and stirring for a period of time not exceeding four hours generally is sufficient to effect the production of a homogeneous product, and it is not advisable to heat and stir for a period of time longer than about four hours.

Any amount of elemental sulphur up to about fifty (50%) per cent of the weight of the mixture (one part sulphur to one part asphalt) may be mixed advantageously with asphalt. When sulphur is employed in amounts in excess of about twenty-five (25%) per cent (one part sulphur to three parts asphalt, by weight), it is advisable to pour and use the mixture immediately, otherwise some segregation may take place. This is especially true when sulphur in an amount equal to fifty (50%) per cent of the mixture (one part sulphur to one part asphalt, by weight) is used with steam blown asphalt or with natural asphalt. When amounts of sulphur up to about twenty-five (25%) percent of the mixture (one part sulphur to three parts asphalt, by weight) are used, it is not necessary to pour the mixture immediately to prevent segregation.

Any suitable type of asphalt may be employed in forming plastic compositions in accordance with the invention. During the greater part of our investigations we employed air blown asphalt of melting degree 80° C., but other types of asphalt such as steam blown, natural asphalts and fluxed natural asphalts also were used successfully.

The sulphur asphalt mixture of the invention possesses many desirable properties by virtue of which it may be employed to advantage for various purposes such, for example, as; for tank linings, for paving roads and floors, for making bricks, for making sewer pipe joints, as a pouring mortar for brick pavements, as a joint material in concrete roads and as a thermoplastic moulding material.

The elemental sulphur in the mixture very markedly changes the temperature susceptibility of the asphalt without changing to any marked degree the advantageous properties of the asphalt such as its toughness and resistance to wear. For example, an undesirable feature of asphalt when used for streets resides in the fact that in very hot weather it becomes quite soft and in very cold weather it tends to become brittle. If higher melting asphalt is used to avoid its softening under heat, it is too brittle to withstand the pounding of the street traffic. The solution of sulphur in asphalt as prepared by us will withstand very wide temperature changes without losing its desirable properties.

The melting point of the sulphur-asphalt mixture of the invention is approximately the same as the melting point of the asphalt used in forming the mixture. It is soluble in carbon bisulphide and carbon tetrachloride. It has a consistency comparable to that of high melting point asphalt without the brittleness of high melting point asphalts, and the temperature susceptibility of the mixture is very markedly less than that of the asphalt alone. When mixed with mineral aggregates, the mixture does not yield or soften under heavy loads as asphalt does. When using ordinary asphalt for streets or other material to carry loads to obtain good results it is necessary to use an angular rock such as a freshly crushed stone, and gravel is not recommended. With the material of the invention, good results can be obtained even when using rounded material like gravel. After cooling and solidification, the mixture of the invention can be remelted to give a homogeneous mixture without additional stirring. In remelting, the temperature should not be allowed to go so high as to cause a chemical reaction between the sulphur and the asphalt, which chemical reaction is evidenced by evolution of hydrogen sulphide.

Mixtures consisting of sulphur and asphalt in which the sulphur is present in amounts equal to about twenty-five (25%) percent by weight are soft and pliable and have rubber-like properties. A sample of such a composition has retained its rubber-like properties over a period of more than two years.

Following are examples of some mixtures which have been tested and found to be satisfactory: (The proportions given refer to weights.)

EXAMPLE I

*Mortar for brick roads*

| | Parts |
|---|---|
| Elemental sulphur | 40 |
| Air blown asphalt, melting point 80° C. | 60 |

EXAMPLE II

*Bricks*

| | Parts |
|---|---|
| Sand | 110 |
| Lime | 17 |
| Air blown asphalt, melting point 80° C. | 17 |
| Elemental sulphur | 17 |

The sulphur and asphalt are first mixed by heating and stirring in the regular way and the filling materials are then added and the bricks moulded under pressure in the usual manner. Bricks of this kind bound together with the sulphur asphalt mortar described above have been successfully used on railroad crossings where there is often a considerable movement at the time the train passes over the crossing and where under such conditions other usual paving materials have not stood up.

EXAMPLE III

*Road paving base*

| | Parts |
|---|---|
| Gravel or crushed rock | 150 |
| Sand | 110 |
| Sulphur-asphalt mixture containing 50 percent air blown asphalt, melting point 80° C., and 50 percent elemental sulphur | 30 |

For surfacing a road covered with a base of the above type, a mixture similar to that described in Example II for making bricks may be employed. A section of road thus prepared, and built and rolled like a regular asphalt road, has stood up well, resisting winter temperatures, and showing no softening or rippling in the summer time when the surface temperature of the road was as high as 150° F. and, sometimes, even as high as 160° F.

The mixture described above are acid-proof in addition to being water-proof. Roads laid with this material can have their surfaces changed by applying a torch to the surface which causes a slight surface burning and a surface chemical reaction between the sulphur and the asphalt so as to make the surface insoluble in organic solvents, make it harder and to bring small particles of aggregate to the surface to give it a high resistance to automobile skidding.

We claim:

1. The method of providing a surface coating which comprises forming a plastic composition comprising elemental sulphur and asphalt, applying the composition to the surface to be coated, and burning the exposed surface of the coating thus formed to effect a chemical reaction between the elemental sulphur and the asphalt contained in the surface portion of the coating.

2. The method of providing a surface coating which comprises forming a plastic composition comprising elemental sulphur, mineral aggregate and asphalt, applying the composition to the surface to be coated, and burning the exposed surface of the coating thus formed to effect a chemical reaction between the elemental sulphur and the asphalt contained in the surface portion of the coating and to bring to the surface of the coating particles of mineral aggregate contained therein.

3. The method of forming a pavement which comprises applying to the surface to be paved a layer of a plastic composition comprising elemental sulphur, mineral aggregate and asphalt, and burning the exposed surface of the layer thus formed to effect a chemical reaction between the elemental sulphur and the asphalt contained in the surface portion of the layer and to bring to the surface of the layer particles of mineral aggregate contained therein.

4. The method of forming a pavement which comprises applying to the surface to be paved a layer of plastic composition comprising elemental sulphur, sand, coarse mineral aggregate and asphalt to form a paving base, placing over the paving base thus formed a surfacing layer of plastic composition comprising elemental sulphur, sand, lime and asphalt and substantially free of coarse mineral aggregate, and burning the exposed surface of the surfacing layer to effect a chemical reaction between the elemental sulphur and the asphalt contained in the surface portion thereof and to bring to the surface particles of sand contained therein.

5. The method of forming a pavement which comprises applying to the surface to be paved a layer of plastic composition comprising elemental sulphur, sand, coarse mineral aggregate and asphalt to form a paving base, placing over the paving base thus formed a surfacing layer of bricks formed of plastic composition comprising elemental sulphur, sand, lime and asphalt and substantially free of coarse mineral aggregate, and burning the exposed surface of the surfacing layer to effect a chemical reaction between the elemental sulphur and the asphalt contained in the surface portion thereof and to bring to the surface particles of sand contained therein.

6. The method of improving the surface qualities of a pavement comprising elemental sulphur, mineral particles and asphalt in which the sulphur is not combined chemically with the asphalt which comprises burning the exposed surface of the pavement to effect a chemical reaction between the elemental sulphur and the asphalt contained in the surface portion and to bring to the surface of the pavement mineral particles contained therein.

7. A pavement having a base formed of a plastic composition comprising elemental sulphur, sand, coarse mineral aggregate and asphalt and having a surfacing layer over the base comprising elemental sulphur, sand, lime and asphalt and substantially free of coarse mineral aggregate, the exposed surface portion of the surfacing layer having sulphur chemically combined with asphalt contained therein through the action of heat applied thereto at a temperature sufficiently high to cause burning.

8. A pavement having a base formed of a plastic composition comprising elemental sulphur, sand, coarse mineral aggregate and asphalt and having a surfacing layer of bricks formed of plastic composition comprising elemental sulphur, sand, lime and asphalt and substantially free of coarse mineral aggregate, the exposed surface portion of the surfacing layer having sulphur chemically combined with asphalt containing therein through the action of heat applied thereto at a temperature sufficiently high to cause burning.

RAYMOND F. BACON.
ISAAC BENCOWITZ.